United States Patent
Miao et al.

(10) Patent No.: US 7,269,142 B2
(45) Date of Patent: Sep. 11, 2007

(54) MANAGING TONE CLAMPING IN A NETWORK

(75) Inventors: Kai X Miao, Boonton Township, NJ (US); Amin F Rhemtulla, Rockaway, NJ (US)

(73) Assignee: Intel Corporation, Santa Clara, CA (US)

( * ) Notice: Subject to any disclaimer, the term of this patent is extended or adjusted under 35 U.S.C. 154(b) by 1072 days.

(21) Appl. No.: 10/306,400

(22) Filed: Nov. 27, 2002

(65) Prior Publication Data

US 2004/0100912 A1 May 27, 2004

(51) Int. Cl.
*H04J 1/16* (2006.01)
(52) U.S. Cl. .................. 370/252; 370/412; 370/526; 379/67.1
(58) Field of Classification Search ............... 370/252, 370/412, 352, 353, 354, 355, 526, 356; 379/67.1, 379/412
See application file for complete search history.

(56) References Cited

U.S. PATENT DOCUMENTS 6,205,120 B1 * 3/2001 Packer et al. .............. 370/235
7,035,293 B2 * 4/2006 Branden .................... 370/526

* cited by examiner

*Primary Examiner*—Chi Pham
*Assistant Examiner*—Alexander O. Boakye
(74) *Attorney, Agent, or Firm*—Kacvinsky LLC (57) ABSTRACT

A method and apparatus to manage tone clamping are described wherein a tone is clamped using a buffer with a first size and the performance of the clamping is analyzed. The buffer is set to a second size in accordance with the analysis. The clamping comprises receiving audio information, storing the audio information in the buffer, detecting tone information in the audio information, and removing the tone information from the audio information. Other embodiments are described and claimed.

15 Claims, 5 Drawing Sheets

MANAGING TONE CLAMPING IN A NETWORK

BACKGROUND

Voice over packet (VOP) technology may be directed to communicating voice information over a packet network. In addition to voice information, VOP networks may also carry tone information that may be interleaved with the voice information. Tone information may be used to communicate commands or control information, such as using Dual Tone Multi-Frequency (DTMF) tones to call a telephone number. A VOP network, however, may need to detect and remove tone information from a voice channel for some applications. This process may be referred to as "tone clamping." Conventional tone clamping technologies, however, may introduce a significant amount of delay into a voice conversation. Consequently, there may be a need for improved tone clamping techniques to reduce such delay and other potential problems.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to manage tone clamping in a network, such as a VOP network. For example, one embodiment of the invention may manage a buffer used for tone clamping. The embodiment may clamp a tone using a buffer with a first size. The embodiment may analyze performance of the tone clamping. The buffer may be set to a second size in accordance with the analysis.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is also worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
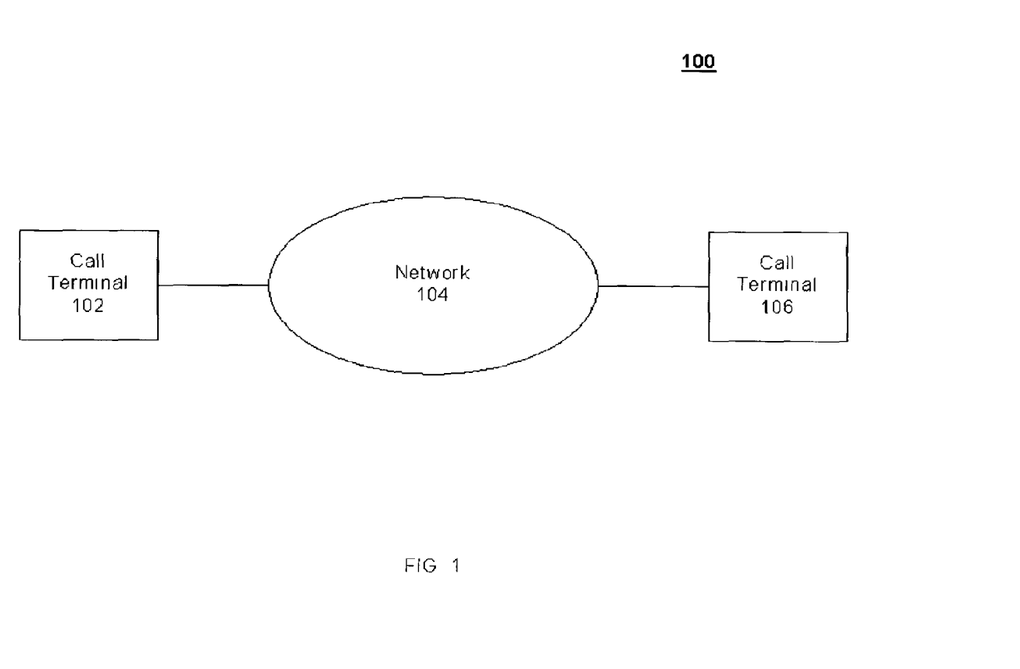
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100. System 100 may comprise, for example, call terminals 102 and 106 connected by a network 104.

Examples of a call terminal may include any device capable of communicating audio and tone signals over a network. A call terminal may comprise, for example, a telephone, a VOP telephone, a wireless telephone, a portable or handheld computer equipped with a transceiver and modem, a personal digital assistant (PDA), a packet telephony telephone, a VOP gateway and so forth.

Network 106 may comprise, for example, a packet network. In one embodiment of the invention, network 106 may operate in accordance with, for example, one or more Internet protocols such as the Transmission Control Protocol (TCP) as defined by the Internet Engineering Task Force (IETF) standard 7, Request For Comment (RFC) 793, adopted in September, 1981; the User Datagram Protocol (UDP) as defined by IETF standard 6, RFC 768, adopted in August, 1980; and the Internet Protocol (IP) as defined by the IETF standard 5, RFC 791, adopted in September, 1981, all available from "www.ietf.org", although the embodiments of the invention are not limited to this context. Network 106 may also operate in accordance with one or more protocols to communicate VOP packets representing audio, voice or tone information. In one embodiment of the invention, for example, network 106 may operate in accordance with the International Telecommunications Union (ITU) Recommendation H.323 titled "Packet-based Multimedia Communication Systems," published in November 2000 ("H.323 Specification"); the ITU Recommendation H.245 titled "Control Protocol For Multimedia Communication", published in July 2001 ("H.245 Specification"); the IETF Proposed Standard RFC 2543 titled "SIP: Session Initiation Protocol," published in March 1999 ("SIP Specification); IETF Proposed Standard RFC 2833 titled "RTP Payload for DTMF Digits, Telephony Tones and Telephony Signals," published in May 2000 ("RFC 2833 Specification"); IETF Proposed Standard RFC 1889 titled "RTP: A Transport Protocol For Real Time Applications," published in January 1996 ("RTP Specification"), all available from "www.ietf.org." Although specific examples are discussed herein, it may be appreciated that the embodiments of the invention are not limited in this context. Further, network 104 may also include circuit-switched technologies and appropriate interfaces to packet network technologies.

Figure 2:
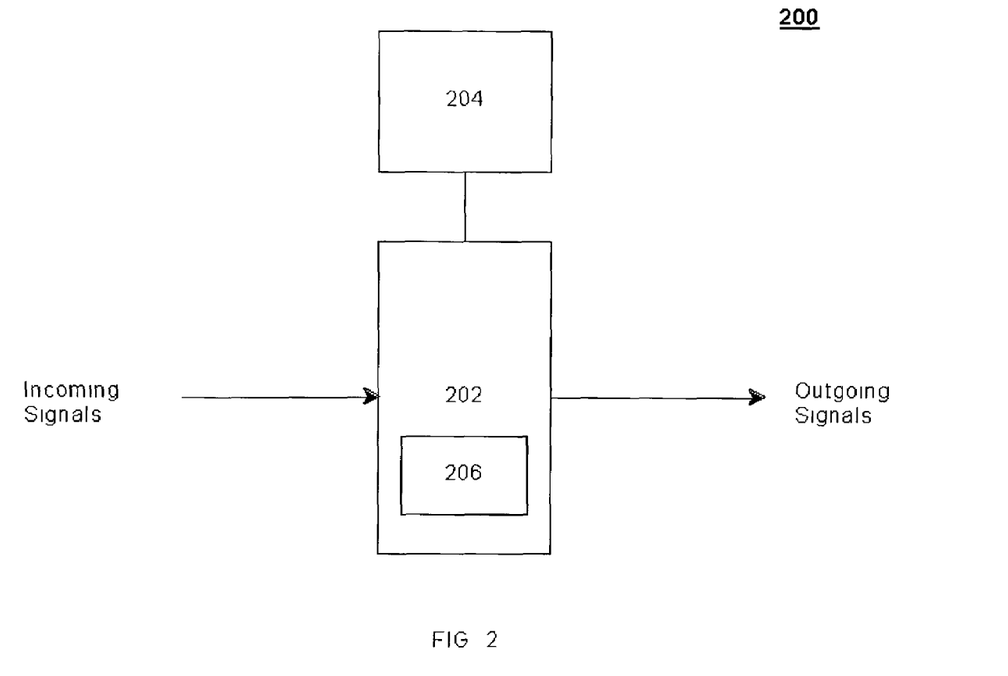
FIG. 2 illustrates a block diagram of a VOP system suitable for use with one embodiment of the invention.

FIG. 2 illustrates a block diagram of a VOP system suitable for use with one embodiment of the invention. FIG. 2 is a block diagram of a system 200. System 200 may comprise part of, for example, system 100 shown in FIG. 1. System 200 may comprise VOP elements 202 and 204. Element 202 may further include element 206.

Element 202 of system 200 may comprise, for example, a media gateway that may operate to convert a conventional telephony call to a packet telephony call or VOP call. In one embodiment, gateway 202 may receive signals from a circuit-switched network and convert them to packet voice signals. An example of a circuit-switched network may be the Public Switched Telephone Network (PSTN). An example of signals communicated via a circuit-switched network may comprise Pulse Code Modulation (PCM) signals. The conversion to packets may be made in accordance with, for example, any number of protocols, such as the RTP Specification and others. Gateway 202 may communicate both call control packets and packet voice signals through other components of system 200 until the packets reach their intended destination, e.g., a call terminal connected to system 200.

Element 204 of system 200 may comprise a media gateway controller or gatekeeper to perform conventional call processing functions, such as address translation, admission control, call control signaling, call authorization, call management and so forth in accordance with any appropriate call processing protocol, such as the Megaco and MGCP protocols, for example. Controller 204 may communicate with gateway 202 via call control packets to perform such call processing functions. In one embodiment of the invention, controller 204 may provide address and routing information to communicate packets through system 200 to the destination call terminal, such as call terminal 106.

In one embodiment of the invention, gateway 202 may also include a Tone Clamping Module (TCM) 206. TCM 206 may perform tone clamping for system 200. Tone clamping may perform the operations of detecting and eliminating tone information embedded in a stream of audio information. This may be desirable for a number of reasons. For example, tone information in a VOP network may be sent using a channel separate from the channel used for voice or audio information. The term "tone information" as used herein may refer to any information used to represent tone signals, including names, tags, frequency components, time information, and so forth. The separate channel may be, for example, a control channel. The use of a control channel to communicate tone information may sometimes be referred to as "Out Of Band" signaling. Meanwhile, that same tone information may still be communicated in the channel used for the voice or audio information. Communicating tone information in an audio channel may sometimes be referred to as "In Band" signaling. When tone information is communicated using Out Of Band signaling, there may be need to remove the tone information from the audio channel to reduce ambiguity at the receiver. In another example, tone information may be detected and removed from an audio channel, and then reinserted into the audio channel as tone identifiers or other tone representations.

Figure 3:
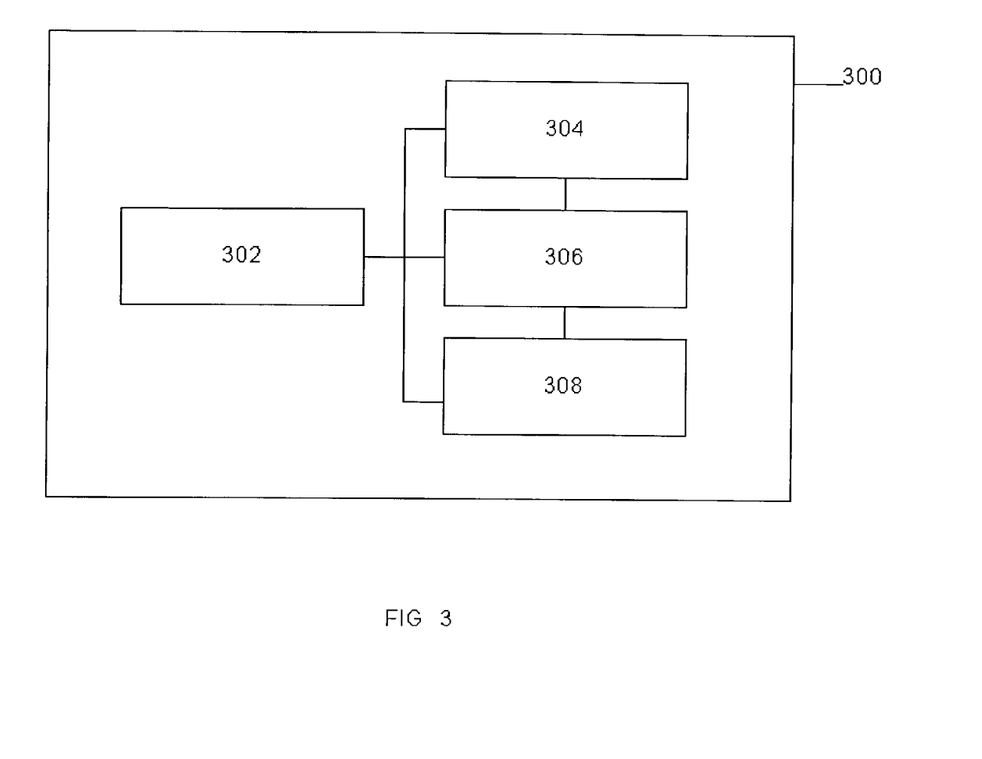
FIG. 3 illustrates a block diagram of a Tone Clamping Module (TCM) in accordance with one embodiment of the invention.

FIG. 3 illustrates a block diagram of a Tone Clamping Module (TCM) in accordance with one embodiment of the invention. FIG. 3 illustrates a TCM 300 that may be representative of TCM 206. TCM 300 may perform tone clamping for system 200. TCM 300 may comprise, for example, a Detection Analysis and Clamping Control (DACC) module 302, a tone damper 304, a circular buffer 306 and a tone detector 308.

In one embodiment of the invention, tone detector 308 may be configured to analyze an incoming stream of audio information to detect the existence of any tone information. Circular buffer 306 may be configured to store the incoming stream of audio information long enough for tone detector 308 to determine whether a tone has been detected. Tone damper 304 may be configured to erase tone information from the stream of audio information once detected.

The amount of audio information stored in circular buffer 306 may depend upon the length of time it takes tone detector 308 to detect any tone information in the stream of audio information. The longer the detection time the more buffer must be used to store the incoming stream. The presence of circular buffer 306 helps reduce the possibility that a receiver may process some tone information before the tone information is properly detected and clamped. Otherwise, a user of the receiver may experience severe quality problems, such as hearing a "clicking" sound every time a tone event occurs. To address this problem, conventional techniques typically allocate excessive amounts of buffer. This may result in, however, an inefficient use of resources as well as introduce additional latency in a telephone conversation.

One embodiment of the invention attempts to reduce these and other problems using DACC 302. DACC 302 may be configured to analyze the performance of the tone clamping operation, and attempt to determine whether the circular buffer size may be modified to improve detection accuracy. For example, in one case the circular buffer size may be too large based on the performance evaluation of the tone clamping process, and therefore the circular buffer size may be decreased without affecting detection accuracy or Quality of Service (QoS). The unallocated memory may then be used for other operations in system 200. In another case, the circular buffer size may be too small thereby affecting QoS, and DACC 302 may increase the circular buffer size to compensate.

In one embodiment of the invention, DACC 302 may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e., floppy disk and hard drive), optical disk (e., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

The operations of systems 100, 200 and 300 may be further described with reference to FIGS. 4-5 and accompanying examples. Although FIGS. 4-5 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 4:
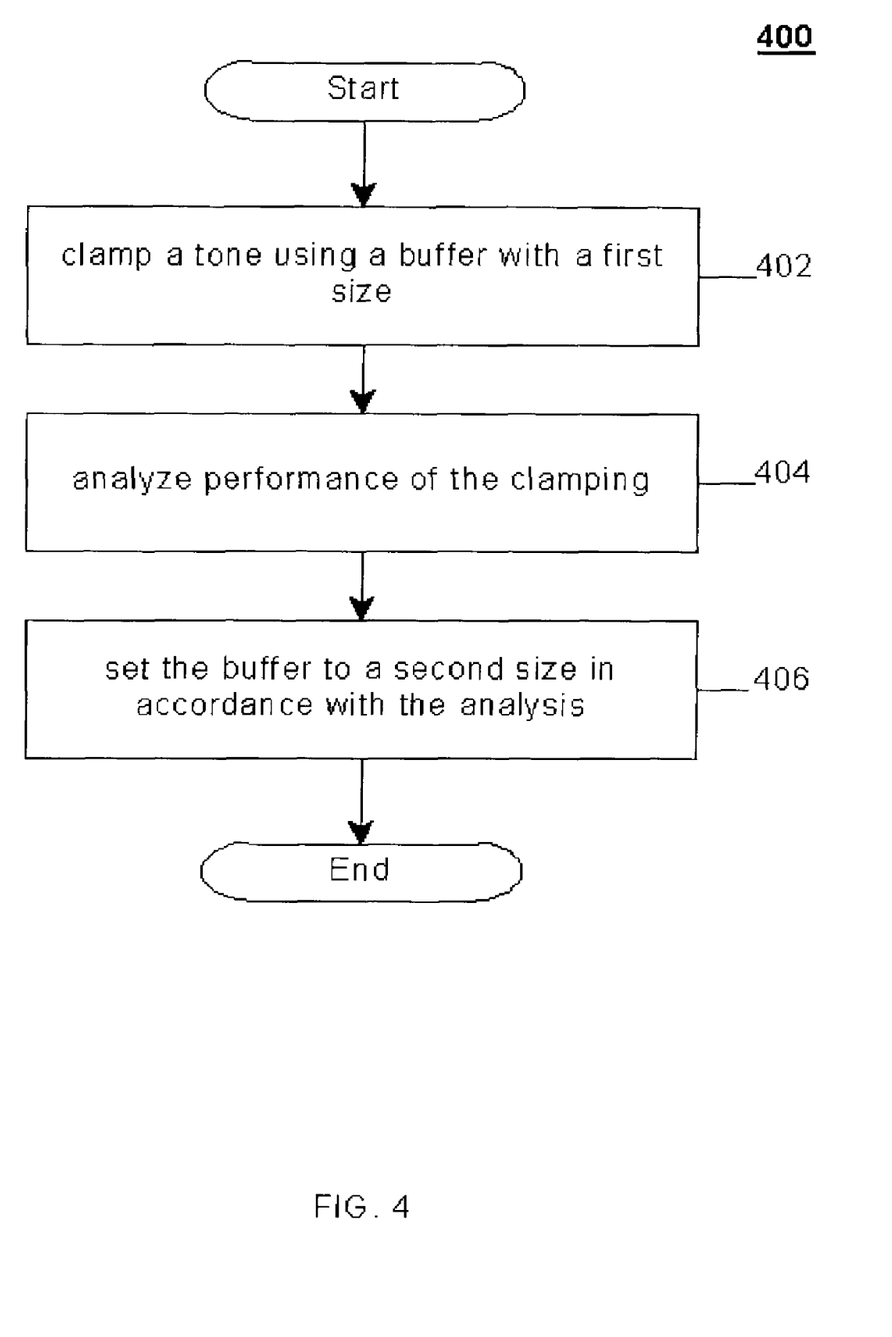
FIG. 4 is a first block flow diagram of the programming logic for a Detection Analysis and Clamping Control (DACC) module in accordance with one embodiment of the invention.

FIG. 4 is a first block flow diagram of the programming logic performed by a DACC in accordance with one embodiment of the invention. In one embodiment of the invention, this or other modules may refer to the software and/or hardware used to implement the functionality for one or more embodiments as described herein. In this embodiment of the invention, this or other modules may be implemented as part of a system, such as TCM 204 of gateway 202. It can be appreciated that this functionality, however, may be implemented by any device, or combination of devices, located anywhere in a communication network and still fall within the scope of the invention.

As shown in programming logic 400, a tone may be clamped using a buffer with a first size at block 402. Performance of the clamping process may be analyzed at block 404. The buffer may be set to a second size in accordance with the outcome of the analysis at block 406. For example, in one embodiment of the invention the second size may be smaller than the first size.

In one embodiment of the invention, the tone clamping may be performed by first receiving audio information. The audio information may be stored in the buffer. Tone information may be detected in the audio information. The tone information may be removed from the audio information if detected.

In one embodiment of the invention, the analysis may be performed by first defining at least one parameter associated with the buffer. The at least one parameter may be measured. The measured value may be compared with a predetermined value, such as a previous measurement or some threshold parameter. For example, the parameter may be defined as a value representing the amount of buffer used to store audio information prior to tone detection. Buffer usage may be measured during the tone detection process, and compared to a predetermined value. The predetermined value may be, for example, a previous value for buffer usage, an average buffer usage value over some number of tone clamping operations, a theoretical buffer usage value optimized for a given tone detector, and so forth.

Figure 5:
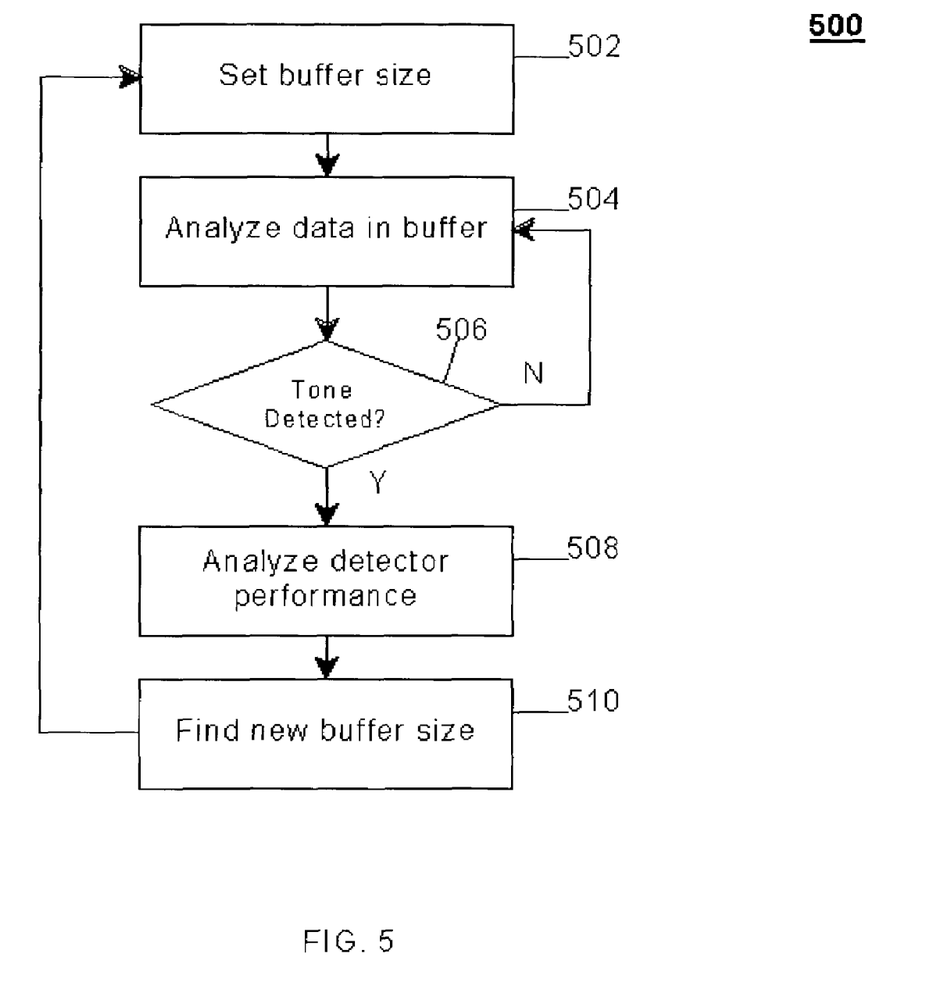
FIG. 5 is a second block flow diagram of the programming logic for a DACC module in accordance with one embodiment of the invention.

FIG. 5 is a second block flow diagram of the programming logic performed by a DACC in accordance with one embodiment of the invention. FIG. 5 illustrates a programming logic 500. Programming logic 500 may represent a particular implementation for a TCM in general and DACC in particular. As shown in FIG. 5, a buffer size may be set at block 502. The data in the buffer may be analyzed at block 504. A determination may be made as to whether a tone was detected at block 506. Tone detector performance may be analyzed at block 508. A new buffer size may be determined at block 510.

The operation of systems 100, 200 and 300, and the processing logic shown in FIGS. 4-5, may be better understood by way of example. Assume a caller uses call terminal 104 to initiate a telephone call session to call terminal 106 via network 104. The caller dials the 10 digit telephone number that is received by network 104. Network 104 initiates call setup using conventional circuit-switched technology via the PSTN and sends the 10 DTMF digits. The circuit-switched signals are received by gateway 202 of system 200. Gateway 202 includes PSTN interface cards and technology to convert the circuit-switched signals to packet-switched signals. Gateway 202 detects the DTMF signals and begins creating RTP tone packets. The RTP tone packets are routed using a separate control channel to call terminal 106. Meanwhile, packets carrying audio information are also generated by gateway 202. The audio information may be communicated using an audio channel to call terminal 106. The audio information, however, may also include the tone information sent via the RTP tone packets. In this case, the audio information may be sent to TCM 206 to remove any tone information.

TCM 206 may receive a stream of packets carrying the audio information, and begin buffering the packets in circular buffer 306. Tone detector 308 begins the tone detection process. Once tone detector 308 determines that a tone is present in the audio information, tone damper 304 may drop all the packets in circular buffer 306 and begin removing the tone information detected by tone detector 308 from the audio stream.

During this process, DACC 302 may be monitoring tone damper 304, circular buffer 306 and tone detector 308. For example, DACC 302 may be monitoring circular buffer 306 to determine when audio information associated with a particular stream of information is beginning to be stored, e.g., the beginning of the buffer. DACC 302 may monitor tone detector 308 for a signal indicating that tone information has been detected. Once DACC 302 receives the tone detection signal, DACC 302 may examine circular buffer 306 to determine how much of it has been used prior to tone detection. Assume that the measured value is 80% of the total buffer size, with the 80% representing that 80% of circular buffer 306 was used prior to tone detection. The measured value of 80% may be compared to a predetermined value. Assume that the predetermined value was 100%, and DACC 302 has been configured to reduce buffer size if the measured value is less than the predetermined value. In this case, DACC 302 may send a signal to circular buffer 306 to reduce its buffer size by 20%.

In another example, DACC 302 may also maintain a timer and start the timer once a new stream of audio information is detected. DACC 302 may monitor tone detector 308 to determine when, if any, tone information is detected. Once detection occurs, the timer may be stopped and a timed value may be identified. Assume that previous performance tests have identified optimized buffer sizes based on detection time. This information may be stored in the form of a table. DACC 302 may search the table using the timed value, and retrieve a new buffer size associated with the timed value. DACC 302 may send a message to circular buffer 306 to modify its current buffer size to the new buffer size.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage tone clamping, comprising:
 clamping a tone using a buffer with a first size;
 analyzing performance of said clamping; and
 setting said buffer to a second size in accordance with said analysis;
 wherein said clamping comprises:
  receiving audio information;
  storing said audio information in said buffer;
  detecting tone information in said audio information; and
  removing said tone information from said audio information.

2. The method of claim 1, wherein said second size is smaller than said first size.

3. The method of claim 1, wherein said second size is larger than said first size.

4. The method of claim 1, wherein said analyzing comprises:
 defining at least one parameter associated with said buffer;
 measuring said at least one parameter; and
 comparing said measurement with a predetermined value.

5. The method of claim 4, wherein said one parameter represents an amount of buffer used to store said audio information prior to said detection.

6. The method of claim 5, wherein said predetermined value represents a previous amount of buffer used to store audio information prior to detection.

7. The method of claim 4, wherein said one parameter represents a time for tone detection.

8. The method of claim 7, further comprising:
searching a table using said time for tone detection; and
retrieving said second buffer size associated with said time for tone detection from said table.

9. An article comprising:
a computer readable storage medium;
said computer readable storage medium including stored executable program instructions that, when executed by a processor, result in managing tone clamping by clamping a tone using a buffer with a first size, analyzing performance of said clamping, and setting said buffer to a second size in accordance with said analysis, said clamping comprising receiving audio information, storing said audio information in said buffer, detecting tone information in said audio information, and removing said tone information from said audio information.

10. The article of claim 9, wherein the stored executable program instructions, when executed by a processor, further result in said analyzing by defining at least one parameter associated with said buffer, measuring said at least one parameter, and comparing said measurement with a predetermined value.

11. A system, comprising:
a computing platform adapted to manage tone clamping;
said platform being further adapted to clamping a tone using a buffer with a first size, analyzing performance of said clamping, and setting said buffer to a second size in accordance with said analysis, said clamping comprising receiving audio information, storing said audio information in said buffer, detecting tone information in said audio information, and removing said tone information from said audio information.

12. The system of claim 11, wherein said platform is further adapted to performing said analyzing by defining at least one parameter associated with said buffer, measuring said at least one parameter, and comparing said measurement with a predetermined value.

13. A tone clamping apparatus, comprising:
a buffer having a first size to store audio information;
a tone detector to detect tone information in said audio information;
a tone damper to remove tone information from said audio information; and
a Detection Analysis and Clamping Control (DACC) module to analyze said tone detector and buffer, and to modify said first size to a second size in accordance with said analysis.

14. The tone clamping apparatus of claim 13, wherein said DACC module monitors buffer usage prior to tone detection by said tone detector, and determines said second size in accordance with said buffer usage.

15. The tone clamping apparatus of claim 13, wherein said DACC module monitors a time for tone detection by said tone detector, and determines said second size in accordance with said time.

* * * * *

UNITED STATES PATENT AND TRADEMARK OFFICE
CERTIFICATE OF CORRECTION

PATENT NO. : 7,269,142 B2
APPLICATION NO. : 10/306400
DATED : September 11, 2007
INVENTOR(S) : Miao et al.

It is certified that error appears in the above-identified patent and that said Letters Patent is hereby corrected as shown below:

On the title page, item (57), in "Abstract", in column 2, line 2, delete "atone" and insert -- a tone --, therefor.

In column 8, line 18, in Claim 13, delete "damper" and insert -- clamper --, therefor.

Signed and Sealed this

Fifteenth Day of April, 2008

JON W. DUDAS
*Director of the United States Patent and Trademark Office*